United States Patent
Vora et al.

(10) Patent No.: US 8,305,962 B2
(45) Date of Patent: Nov. 6, 2012

(54) OPTIMIZATION IN HETEROGENEOUS NETWORKS

(75) Inventors: Naheed Vora, Santa Clara, CA (US); Kevin Tang, Dublin, CA (US); Yinghua Ye, Mountain View, CA (US); Meghana Sahasrabudhe, Sunnyvale, CA (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 508 days.

(21) Appl. No.: 12/457,808

(22) Filed: Jun. 22, 2009

(65) Prior Publication Data

US 2010/0322212 A1 Dec. 23, 2010

(51) Int. Cl.
*H04W 4/00* (2009.01)

(52) U.S. Cl. ........ 370/328; 370/331; 370/389; 455/433; 455/439

(58) Field of Classification Search .................. 370/328, 370/331, 389; 455/433, 439
See application file for complete search history.

(56) References Cited

U.S. PATENT DOCUMENTS

| | | |
|---|---|---|
| 2006/0141995 A1 | 6/2006 | Purnadi et al. |
| 2008/0070544 A1 | 3/2008 | Lior |
| 2008/0144615 A1* | 6/2008 | Casey .......................... 370/389 |
| 2009/0197597 A1* | 8/2009 | Kotecha ...................... 455/433 |

FOREIGN PATENT DOCUMENTS

| | | |
|---|---|---|
| EP | 1 841 275 A2 | 10/2007 |
| WO | WO 2007/133844 | 11/2007 |

* cited by examiner

*Primary Examiner* — Ricky Ngo
*Assistant Examiner* — Richard K Chang
(74) *Attorney, Agent, or Firm* — Staas & Halsey LLP

(57) ABSTRACT

A heterogeneous wireless communication network includes a home access network with a home network characteristic and a home network policy, and a visiting access network with a visiting network characteristic and a visiting network policy. A packet data node gateway is adapted to communicate with the home access network and the visiting access network over a first communication path. An out-of-band communication path substantially separate from the first communication path is adapted to carry the visiting network policy from the visiting access network to the packet data node gateway. When the terminal is handed off from the home network to the visiting network, the packet data node gateway retrieves the visiting network policy, and the terminal accesses the visiting network over the first communication path using the visiting network policy.

8 Claims, 3 Drawing Sheets

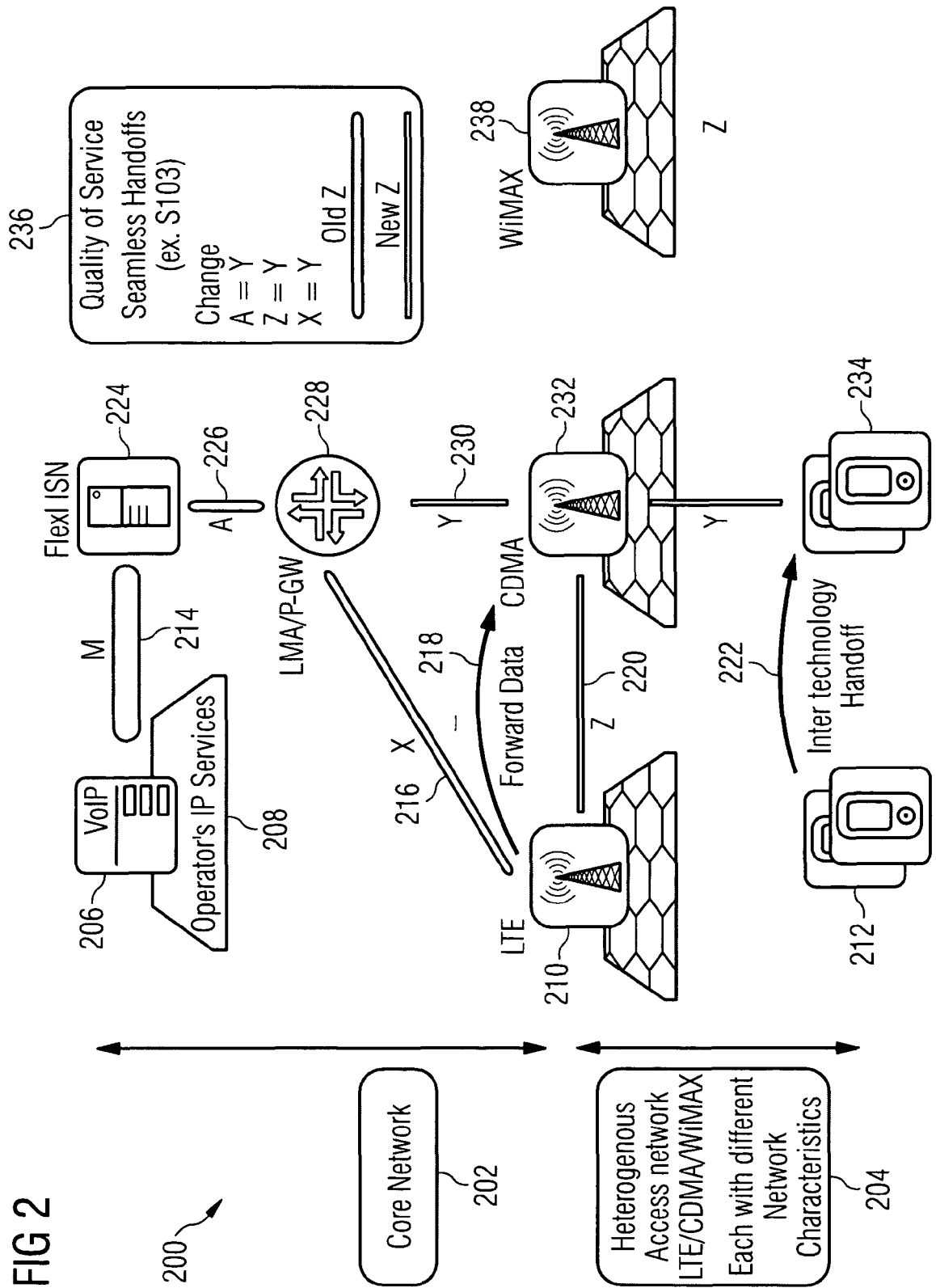

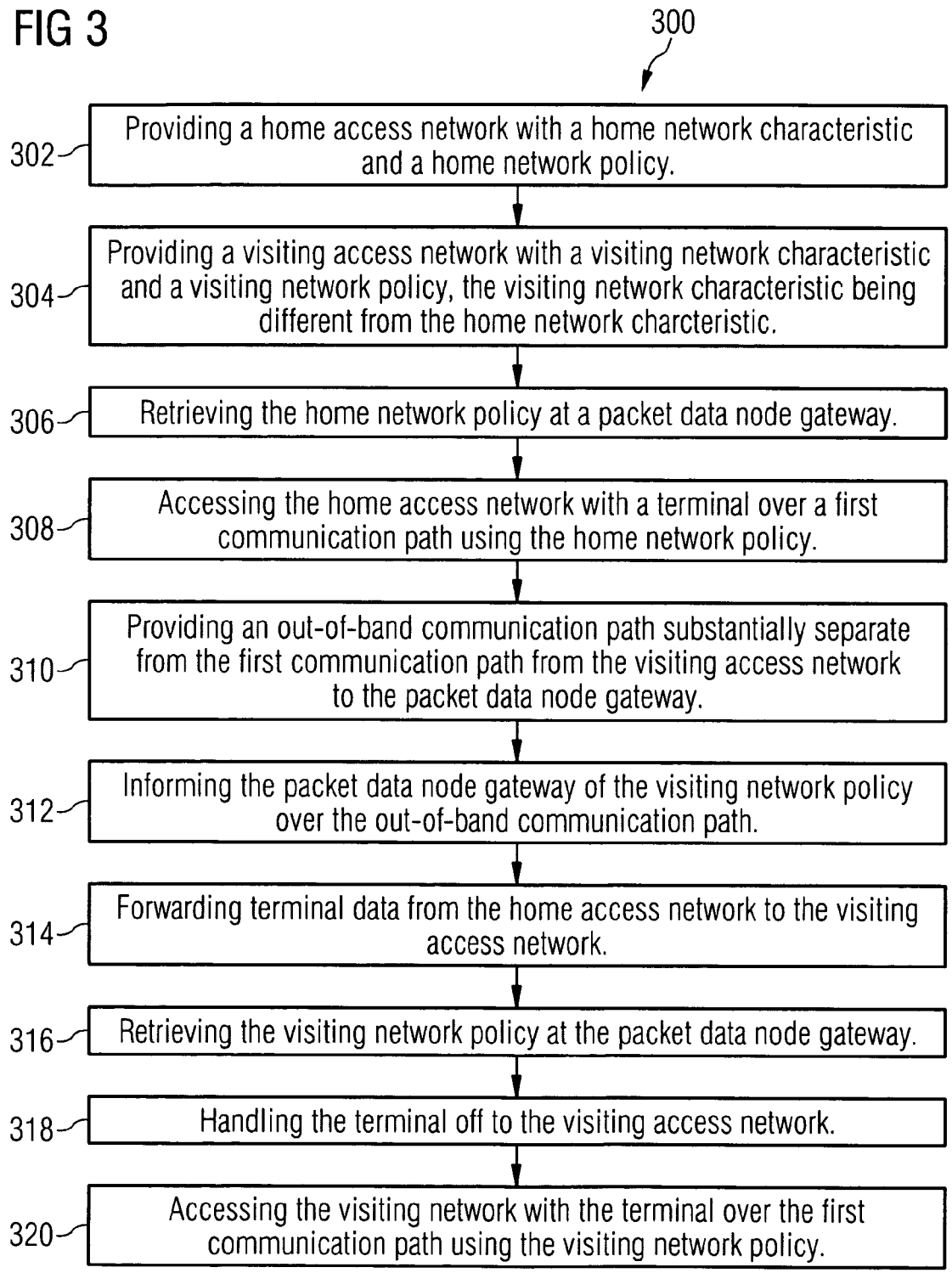

OPTIMIZATION IN HETEROGENEOUS NETWORKS

BACKGROUND

1. Field

In various embodiments, heterogeneous networks are optimized substantially.

2. Description of the Related Art

In FIG. 1 is shown a conventional wireless network 100. The wireless network 100 includes a core network 102 and several heterogeneous access networks 104. The core network 102 may include a packet data node gateway 124, which may be, in the alternative, a home agent. The core network 102 may also include a Flexi ISN 120, connected to a voice over IP facility 106 comprising an operator's IP services 108.

The heterogeneous access networks 104 may each have different network characteristics. The heterogeneous access networks 104, for example, may be characterized as long-term evolution networks, code division multiple access networks, or WiMAX networks, in various embodiments.

In such a wireless network 100, a packet control relay function sets policies under which a terminal 130 accesses a given access network, such as home access network 110, or visiting access network 126. When the terminal 130 accesses the visiting access network 126, the core network 102 retrieves the policy appropriate for the visiting access network 126 from the visiting packet control relay function available on the visiting access network 126. The core network 102, however, will only be able to retrieve the visiting packet control relay function if the terminal 112 has gone through full registration on the visiting access network 126. If the terminal 112 has gone through full registration on the visiting access network 126, in particular, the visiting policy control relay function will be known.

SUMMARY

In one aspect, a heterogeneous wireless communication network includes a home access network with a home network characteristic and a home network policy, a visiting access network with a visiting network characteristic and a visiting network policy, a packet data node gateway adapted to communicate with the home access network and the visiting access network over a first communication path, the packet data node gateway retrieving the home network policy, a terminal adapted to access the home network over the first communication path using the first network policy, an out-of-band communication path from the visiting access network to the packet data node gateway, the out-of-band communication path substantially separate from the first communication path, the out-of-band communication path adapted to carry the visiting network policy to the packet data node gateway, wherein when the terminal is handed off from the home network to the visiting network, the packet data node gateway retrieves the visiting network policy, and the terminal accesses the visiting network over the first communication path using the visiting network policy.

In another aspect, a method of optimizing usage of a heterogeneous wireless communication network includes providing a home access network with a home network characteristic and a home network policy, providing a visiting access network with a visiting network characteristic and a visiting network policy, the visiting network characteristic being different from the home network characteristic, retrieving the home network policy at a packet data node gateway, accessing the home access network with a terminal over a first communication path using the home network policy, providing an out-of-band communication path substantially separate from the first communication path from the visiting access network to the packet data node gateway, informing the packet data node gateway of the visiting network policy over the out-of-band communication path, forwarding terminal data from the home access network to the visiting access network, retrieving the visiting network policy at the packet data node gateway, handing the terminal off to the visiting access network, and accessing the visiting network with the terminal over the first communication path using the visiting network policy.

In still another aspect, a method of optimizing usage of a heterogeneous wireless communication network includes providing a first network with a first network policy, providing a second network with a second network policy, retrieving the first network policy at a core network, accessing the first network with a terminal over a first communication path using the first network policy, providing an out-of-band communication path substantially separate from the first communication path from the second network to the core network, informing the core network of the second network policy over the out-of-band communication path, forwarding terminal data from the first network to the second network, retrieving the second network policy at the core network, handing the terminal off to the second network, and accessing the second network with the terminal over the first communication path using the second network policy.

The above-described embodiments of the present invention are intended as examples, and all embodiments of the present invention are not limited to including the features described above.

BRIEF DESCRIPTION OF THE DRAWINGS

FIG. 2 is a schematic of a heterogeneous wireless network according to an embodiment of the invention;
and
FIG. 3 is a process for optimizing a heterogeneous wireless network according to an embodiment of the invention.

DETAILED DESCRIPTION OF THE PREFERRED EMBODIMENTS

Figure 1:
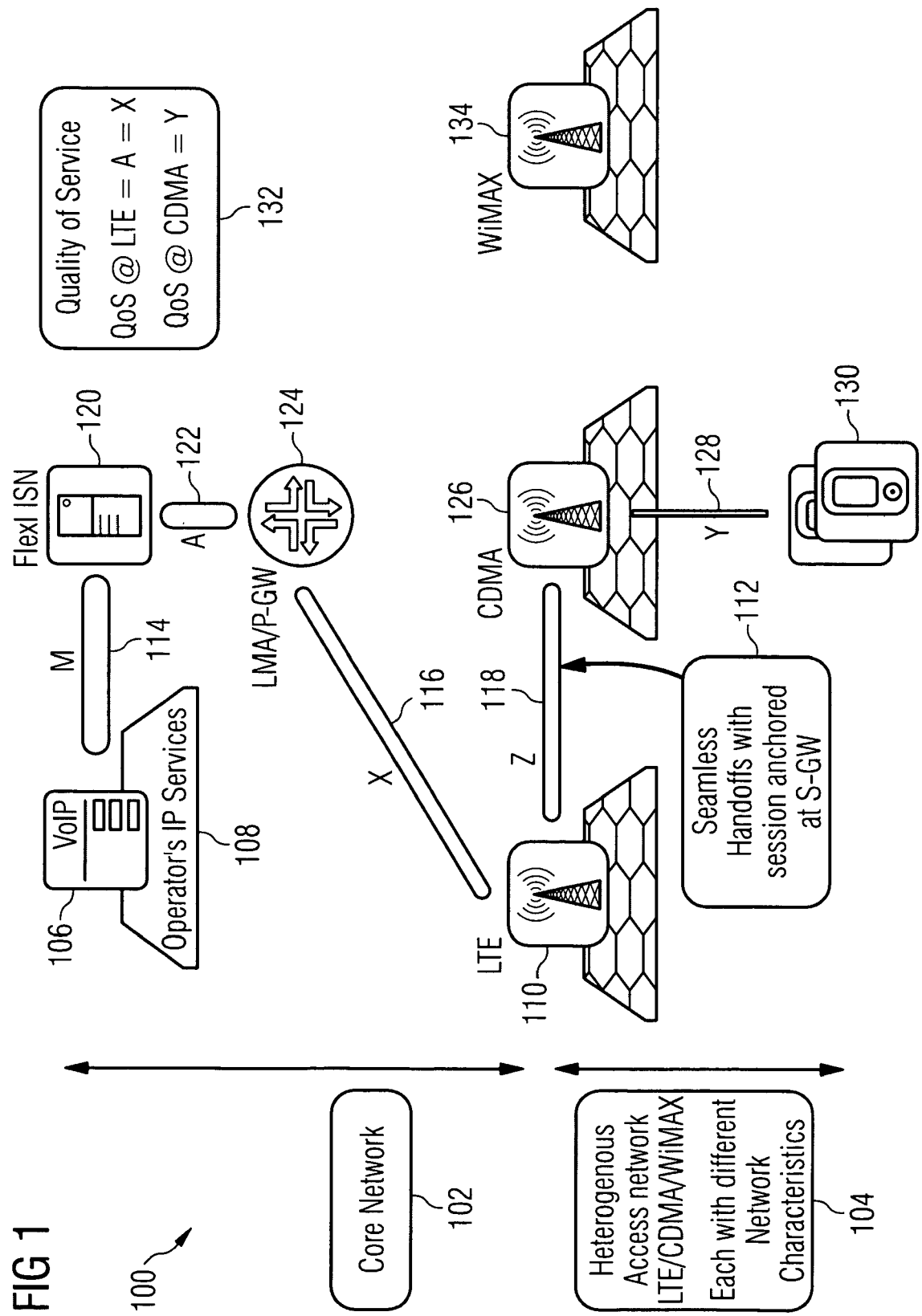
FIG. 1 is a schematic of a conventional wireless network.

Reference may now be made in detail to embodiments of the present invention, examples of which are illustrated in the accompanying drawings, wherein like reference numerals refer to like elements throughout.

In the case of a fast handoff, using the conventional network shown in FIG. 1, the terminal 112 may not have gone through full registration at the visiting network 126, and the packet data node gateway 124 may not be aware of the visiting network 126, or its packet control relay function. In such a case, the terminal 112 may be trying to use the quality of service parameters associated with the home packet control relay function to access a network that may not support them. Thus, it would be desirable if the visiting packet control relay function could be updated periodically on the packet data node gateway 124, so that the terminal 112 could use quality of service parameters supported by the visiting access network 126.

In FIG. 2 is shown a heterogeneous wireless communication network 200 according to an embodiment of the invention. The wireless communication network 200 may be similar to the wireless network 100 shown in FIG. 1, in that it may include a core network 202 and several heterogeneous access networks 204 as well. The core network 202 may include a packet data node gateway 228, which may be, in the alternative, a home agent.

The packet data node gateway 228 may be adapted to communicate with the home access network 210 and the visiting access network 232 over a first communication path 216. The packet data node gateway 228 may retrieve the home network policy from the home access network 210. In one embodiment, the packet data node gateway 228 is a home agent.

The core network 202 may also include a Flexi ISN 224, connected to a voice over IP facility 206 comprising an operator's IP services 208.

The heterogeneous access networks 204 may each have different network characteristics. The heterogeneous access networks 204, for example, may be characterized as long-term evolution networks, code division multiple access networks, or WiMAX networks, in various embodiments.

Among the heterogeneous access networks 204 may be the home access network 210 with a home network characteristic and a home network policy. A visiting access network 232 with a visiting network characteristic and a visiting network policy may also be included among the heterogeneous access networks 204.

In Table I is shown an example of various underlying qualities of service that may be supported for a given terminal by a given access network:

TABLE I

| QoS Parameters | Network Layer/Element |
| --- | --- |
| A | PDN-GW/HA |
| X | Home Access Network |
| Y | Visiting Access Network |

As shown in Table I, quality of service parameter A, which is supported at the packet data node gateway 228, is synchronized with quality of service parameter X, at the home access network 210, so that they are always the same. In the case of a fast handoff, however, the packet data node gateway 228 might still be operating at quality of service parameter X, even though the visiting access network 232, to which the terminal 234 has been handed off, only supports quality of service parameter Y.

The wireless communication network 200 may be accessed by a terminal 212. The terminal 212 may be adapted to access the home access network 210 over the first communication path 216 using the first network policy. In this case, since the home access network 210 is the home access network for the terminal 212, the terminal 212 is assumed to have gone through full registration on the home access network 210. Consequently, the packet data node gateway 228 is presumed to be aware of the home access network 210, including the home packet control relay function.

If the terminal 212 is handed off from the home access network 210 to the visiting access network 232, the terminal 212 will access the visiting access network 232 as terminal 234. In that case, the packet data node gateway 228 retrieves the visiting network policy. In FIG. 2, the terminal 234 represents the terminal after it has been handed off to the visiting access terminal 232.

If the terminal 212 is handed off using fast handoff from the home access network 210 to the visiting access network 232, on the other hand, the packet data node gateway 228 may not be aware of the quality of service parameters that are supported for a terminal by the visiting access network 232.

Thus, the terminal 234 will not be able to access the visiting access network 232 using quality of service parameters supported by the visiting access network 232. The terminal 234, rather, may be trying to access the visiting access network 232 using the quality of service parameters for the home access network 210.

In one embodiment, an out-of-band communication path 230 may be provided from the visiting access network 232 to the packet data node gateway 228. The out-of-band communication path 230 may be substantially separate from the first communication path. The out-of-band communication path 230 may be adapted to carry the visiting network policy to the packet data node gateway 228, informing the packet data node gateway 228 of the visiting network policy before the terminal 234 begins to access the visiting access network 232.

In one embodiment, the visiting network policy is obtained dynamically, and updated in real-time. In this embodiment, the packet data node gateway 228 could synchronize its quality of service parameter A with the quality of service parameter Y required by the visiting access network 232, allowing a substantially seamless handoff of terminal 234 to visiting access network 232. The terminal 234 accesses the visiting network over the first communication path 216 using the visiting network policy.

In one embodiment, the out-of-band communication path 230 could be implemented by adding an extra extension to the proxy mobile IP. The extension could send the quality of service parameters of the underlying access network to the packet data network gateway periodically.

In one embodiment, network usage can be optimized in those scenarios where a quality of service parameter X is substantially identical to a quality of service parameter Y, by ensuring that the quality of service parameters are synchronized periodically between the packet data network gateway and the access networks. The network usage can be optimized in this embodiment by reducing the quality of service parameter A at the packet data network gateway 228 such that the quality of service parameter equals Y instead of X.

In FIG. 3 is shown a process 300 of optimizing usage of a heterogeneous wireless communication network. In a first operation 302, a home access network is provided. The home access network has a home network characteristic and a home network policy. In several embodiments, the home network characteristic may be a transmission format, such as code division multiple access, time division multiple access, frequency division multiple access, orthogonal frequency division multiple access, or long-term evolution. In one embodiment, the home network policy may be a level of quality of service, or a quality of service parameter. In one embodiment, the home network policy comprises a home packet control relay function.

Then, the process 300 moves from the first operation 302 to the second operation 304, in which a visiting access network is provided. The visiting access network has a visiting network characteristic and a visiting network policy. In several embodiments, the visiting network characteristic may be a transmission format, such as code division multiple access, time division multiple access, frequency division multiple access, orthogonal frequency division multiple access, or long-term evolution. In one embodiment, the visiting network characteristic is different from the home network characteristic.

In one embodiment, the visiting network policy may be a level of quality of service, or a quality of service parameter. In one embodiment, the visiting network policy comprises a visiting packet control relay function.

Then, the process 300 moves from the second operation 304 to a third operation 306, in which the home network policy is retrieved at a packet data node gateway. In another embodiment, the packet data node gateway may be a home agent.

Then, the process 300 moves from the third operation 306 to a fourth operation 308, in which the home access network is accessed by a terminal over a first communication path using the home network policy. In one embodiment, the first communication path may include control messages, such as control messages used with a proxy mobile IP protocol.

Then, the process 300 moves from the fourth operation 308 to a fifth operation 310, in which an out-of-band communication path is provided. In one embodiment, the out-of-band communication path comprises an extension to a proxy mobile IP of the terminal. In one embodiment, the out-of-band communication path is carried from the visiting access network to the packet data node gateway on an out-of-band communication path substantially separate from the first communication path. In one embodiment, the out-of-band communication path piggybacks on the first communication path, but has no interaction with control messages carried over the first communication path.

Then, the process 300 moves from the fifth operation 310 to a sixth operation 312, in which the packet data node gateway is informed of the visiting network policy over the out-of-band communication path.

Then, the process 300 moves from the sixth operation 312 to a seventh operation 314, in which terminal data is forwarded from the home access network to the visiting access network.

Then, the process 300 moves from the seventh operation 314 to an eighth operation 316, in which the visiting network policy is retrieved at the packet data node gateway.

Then, the process 300 moves from the eighth operation 316 to a ninth operation 318, in which the terminal is handed off to the visiting access network.

Finally, the process 300 moves from the ninth operation 318 to a tenth operation 320, the visiting network is accessed by the terminal over the first communication path using the visiting network policy.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of optimizing usage of a heterogeneous wireless communication network, comprising:
   providing a home access network with a home network characteristic and a home network policy;
   providing a visiting access network with a visiting network characteristic and a visiting network policy, the visiting network characteristic being different from the home network characteristic;
   retrieving the home network policy at a packet data node gateway;
   accessing the home access network with a terminal over a first communication path using the home network policy;
   providing an out-of-band communication path substantially separate from the first communication path from the visiting access network to the packet data node gateway;
   informing the packet data node gateway of the visiting network policy over the out-of-band communication path;
   forwarding terminal data from the home access network to the visiting access network;
   retrieving the visiting network policy at the packet data node gateway;
   handing the terminal off to the visiting access network; and
   accessing the visiting network with the terminal over the first communication path using the visiting network policy,
   wherein the visiting network characteristic is updated periodically by the packet data node gateway over the out-of-band communication path so that the terminal can use the visiting network policy supported by the visiting access network.

2. The method of claim 1, wherein the home and the visiting network characteristics consists of a standard selected from the group consisting of code division multiple access, time division multiple access, frequency division multiple access, and long-term evolution.

3. The method of claim 1, wherein the home network policy comprises a home packet control relay function.

4. The method of claim 1, wherein the visiting network policy comprises a visiting packet control relay function.

5. The method of claim 1, wherein the out-band-band communication path comprises an extension to a proxy mobile IP of the terminal.

6. The method of claim 1, wherein the home and visiting network policies are quality of service parameters.

7. A heterogeneous wireless communication network, comprising:
   a home access network with a home network characteristic and a home network policy;
   a visiting access network with a visiting network characteristic and a visiting network policy;
   a packet data node gateway adapted to communicate with the home access network and the visiting access network over a first communication path, the packet data node gateway retrieving the home network policy;
   a terminal adapted to access the home access network over the first communication path using the first network policy; and
   an out-of-band communication path from the visiting access network to the packet data node gateway, the out-of-band communication path substantially separate from the first communication path, the out-of-band communication path adapted to carry the visiting network policy to the packet data node gateway;

wherein when the terminal is handed off from the home access network to the visiting access network, the packet data node gateway retrieves the visiting network policy, and the terminal accesses the visiting access network over the first communication path using the visiting network policy, and wherein the visiting network characteristic is updated periodically by the packet data node gateway over the out-of-band communication path so that the terminal can use the visiting network policy supported by the visiting access network.

8. A method of optimizing usage of a heterogeneous wireless communication network, comprising:

providing a first network with a first network policy;
providing a second network with a second network policy;
retrieving the first network policy at a core network;
accessing the first network with a terminal over a first communication path using the first network policy;
providing an out-of-band communication path substantially separate from the first communication path from the second network to the core network;
informing the core network of the second network policy over the out-of-band communication path;
forwarding terminal data from the first network to the second network;
retrieving the second network policy at the core network;
handing the terminal off to the second network; and
accessing the second network with the terminal over the first communication path using the second network policy, and
wherein the second network characteristic is updated periodically over the out-of-band communication path so that the terminal can use the second network policy supported by the second access network.

* * * * *